United States Patent
Wu

(10) Patent No.: US 6,845,436 B1
(45) Date of Patent: Jan. 18, 2005

(54) SYNCHRONIZED SIGNAL TRANSFER SYSTEM

(75) Inventor: Leon Li-Heng Wu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 646 days.

(21) Appl. No.: 09/213,924

(22) Filed: Dec. 17, 1998

(51) Int. Cl.[7] .............................................. G06F 12/00
(52) U.S. Cl. ....................... 711/167; 713/400; 365/233
(58) Field of Search ........................... 710/58; 711/167, 711/104, 105; 713/400, 500, 502, 600, 601; 369/53.44; 327/153; 365/189.05, 233, 193, 194

(56) References Cited

U.S. PATENT DOCUMENTS

| | | | | |
|---|---|---|---|---|
| 5,497,362 A | * | 3/1996 | Aizawa .................... | 369/53.44 |
| 6,075,393 A | * | 6/2000 | Tomita et al. .............. | 327/153 |
| 6,604,180 B2 | * | 8/2003 | Jeddeloh ..................... | 711/169 |

* cited by examiner

*Primary Examiner*—Pierre M. Vital
(74) *Attorney, Agent, or Firm*—Kelly K. Kordzik; Winstead Sechrest & Minick P.C.; Robert M. Carwell

(57) ABSTRACT

A memory system for a data processor whereby a plurality of memory devices, or storage chips, are coupled to a memory controller. There may be one, two, or more such memory devices, wherein some of the memory devices may be coupled to the memory controller via a single data bus, with an alternative embodiment including a second plurality of such memory devices coupled to the memory controller via a second data bus. Two separate clock buses are used to transport data between the memory controller and the various memory devices. A first clock bus is used to synchronize the transfer of data from the memory controller to a memory device. This clock bus will have a clock signal generated at the memory controller through a clock generation circuitry as a function of a system clock received by the memory controller. A similar clock generation circuitry at the memory device will receive the clock signal in order to synchronize the transfer of the data from a sending latch of the memory controller to a receiving latch in the memory device. A separate clock bus is used to transfer data from a memory device to the memory controller. Again, a clock signal is generated at the memory controller and sent on the second clock bus to the memory device. Clock generation circuits at the memory controller and at the memory device synchronize the sending latch at the memory device with the receiving latch at the memory controller. Both of the clock signals are synchronized with each other and with the received system clock.

32 Claims, 13 Drawing Sheets

A = 1/64 cycles
B = 1/8
C = 1/4

Reset to 1

Reset to 0

SYNCHRONIZED SIGNAL TRANSFER SYSTEM

TECHNICAL FIELD

The present invention relates in general to data processing systems, and in particular, to the storage of data in memory.

BACKGROUND INFORMATION

The performance of a complex digital processing system is determined by the performance of the processing unit and the performance of the storage unit. The performance of the processing unit is generally measured by the number of instructions executing per unit time. The performance of the storage unit is measured by the number of bytes supplied or stored per unit time. Furthermore, the performance of the processing unit goes hand in hand with the performance of the storage unit. Therefore, unless the supply rate of raw data and the store rate of data generated from processing matches the processing speed of the processor, the processing unit will be stalled and idle most of the time.

There are several levels of storage units in the system. Broadly speaking, they can be grouped as two major categories. One is referred to as cache. Another one is referred to as memory. Cache is further divided into L1, L2 and L3 caches. SRAM is used for cache. DRAM is used for memory. The sequence of storage access from the CPU (central processing unit) for such a hierarchy is L1-L2-L3-memory. The density, power and cost per bit, the total number of bytes per level, as well as the access cycle time of the storage array are increased along this sequence.

From generation to generation of semiconductor technology, the access time of SRAM has followed the performance trend of logic circuits, but the access time performance of the DRAM has remained relatively flat. To improve the performance (data rate) of a storage unit, several techniques are generally used. These techniques includes access interleave and simultaneous access of multiple independent banks for multiple bits and rapid scan out of the data sequentially in a data bus. Such techniques are especially important for the main memory in the storage unit of a complex system.

SUMMARY OF THE INVENTION

The present invention addresses the foregoing problems by providing a memory system for a data processor whereby a plurality of memory devices, or storage chips, are coupled to a memory controller. There may be one, two, or more such memory devices, wherein some of the memory devices may be coupled to the memory controller via a single memory bus, with an alternative embodiment including a second plurality of such memory devices coupled to the memory controller via a second memory bus.

Each of these memory buses utilizes two separate clock buses to transport data between the memory controller and the various memory devices. A first clock bus is used to synchronize the transfer of data from the memory controller to a memory device. This clock bus will have a clock signal generated at the memory controller through a clock generation circuitry as a function of a system clock received by the memory controller. A similar clock generation circuitry at the memory device will receive the clock signal in order to synchronize the transfer of the data from a sending latch of the memory controller to a receiving latch in the memory device.

A separate clock bus is used to transfer data from a memory device to the memory controller. Again, a clock signal is generated at the memory controller and sent on the second clock bus to the memory device. Clock generation circuits at the memory controller and at the memory device synchronize the sending latch at the memory device with the receiving latch at the memory controller.

Both of the clock signals are synchronized with each other and with the received system clock.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
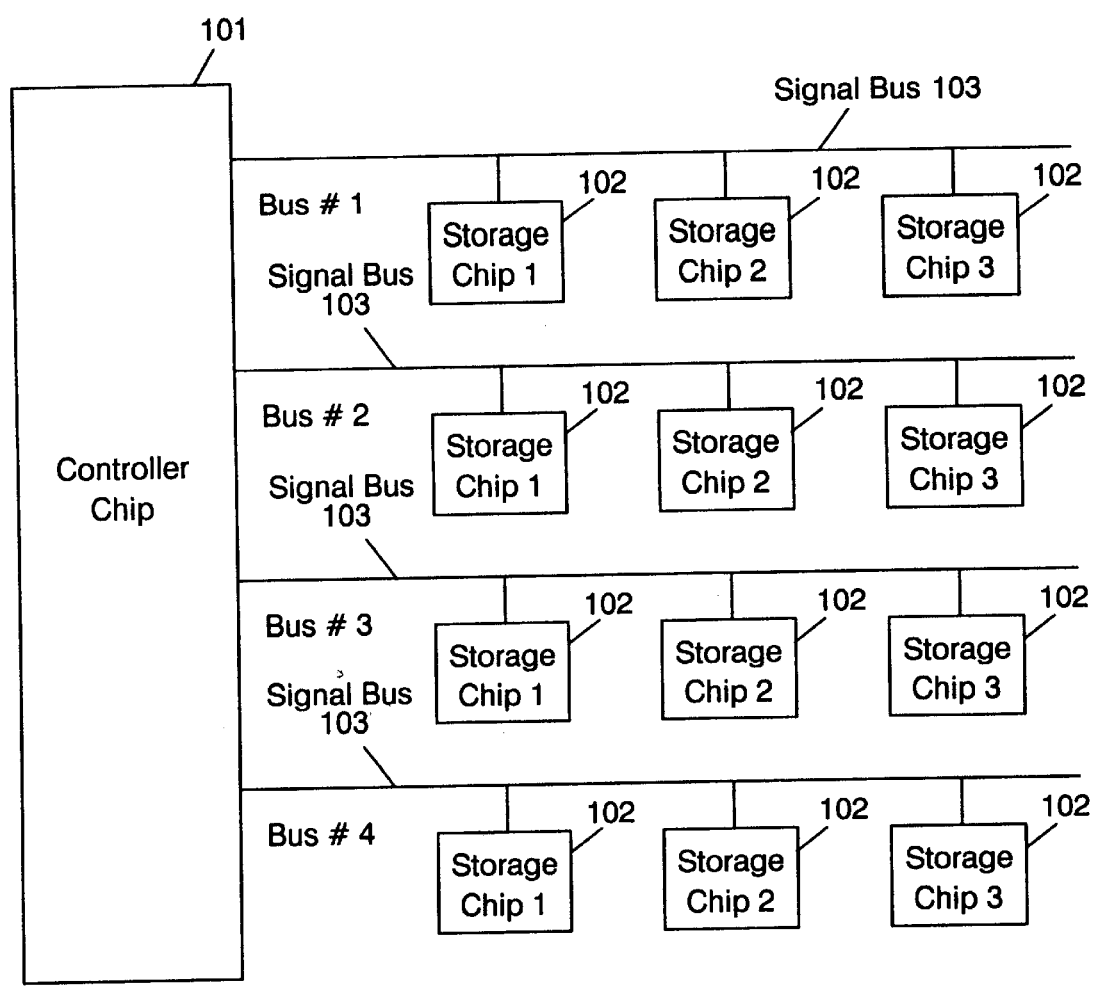
FIG. 1 illustrates a plurality of storage chips coupled to a controller chip.

The data transfer system of the present invention includes a controller chip (or chips), an array of storage chips and a clocking distribution system for multiple buses originated from the controller chip to all storage chips. Various novel features include the clock generating facilities, facilities for synchronizing various bus clocks in the controller chip, the clock synchronization facilities in the storage chip, and the data launching method in the storage chip.

This transfer system can be applied to the controller chip and memory chips in a memory card. A semi-private data bus may be used. Typical signals in conventional asynchronized or synchronized DRAMs may be used. The selection of bits may be based on the principle of orthogonality. The chip kill feature may also be maintained if a 4 or 8 bit memory chip will be used. This transfer system may also be applied to a common bus such as that used by a personal computer. In principle, any preferred protocol by the user may be implemented for the communication. The transfer system may also be applied to an L2 or L3 cache. In that case, SRAM instead of DRAM will be used as storage chips.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 illustrates a controller chip 101 and a plurality of storage chips 102. The controller chip 101 is connected to these storage chips 102 with n (4 in FIG. 1) signal buses (#1 to #4) 103. Note, the present invention is applicable to any number of chips and/or buses; however, the present invention will hereinafter be described with respect to 4 buses 103. The package for this transfer system can be so designed that the propagation difference among all signal lines and the clock lines within one bus is very small.

Figure 2:
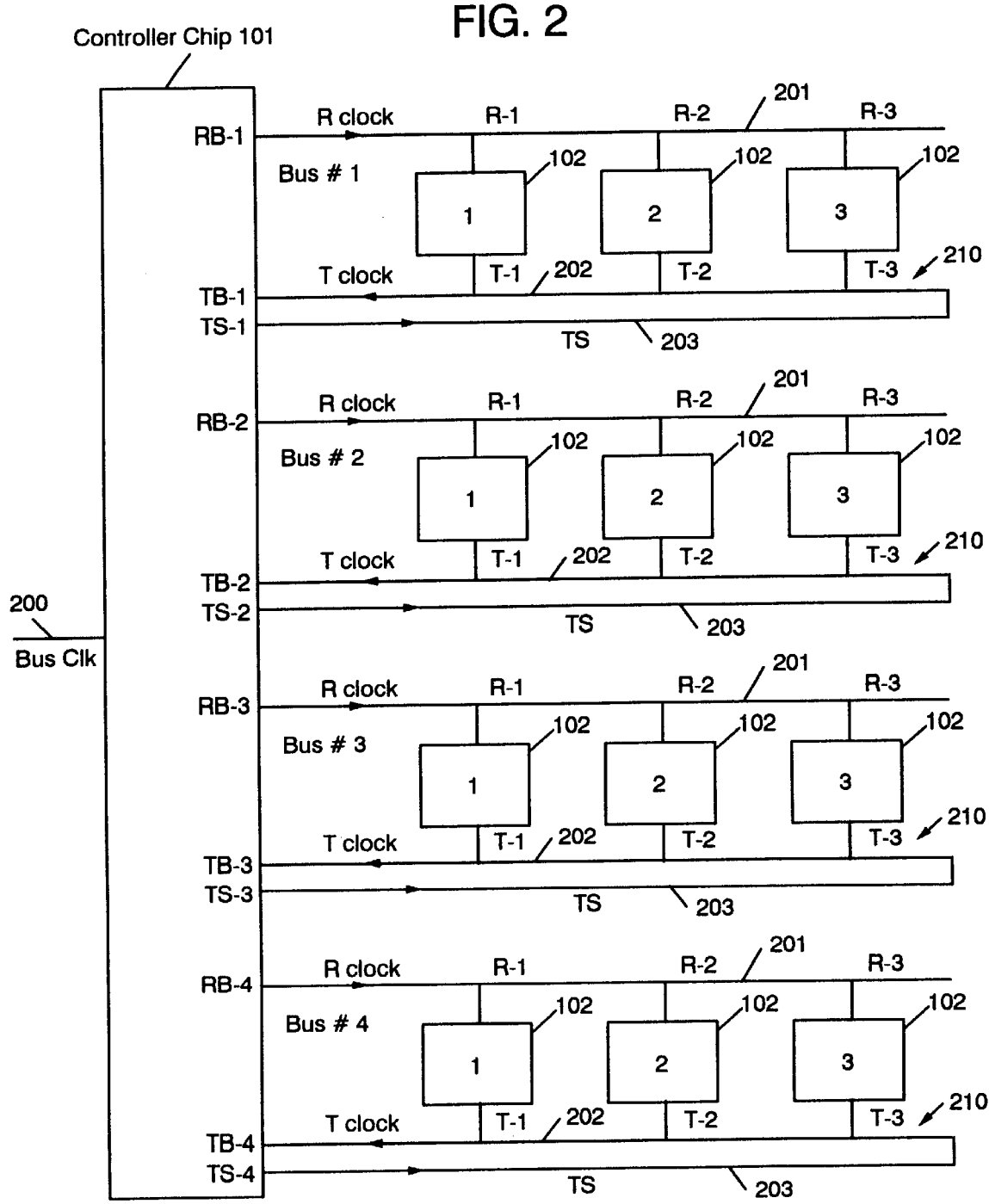
FIG. 2 illustrates clock distribution in accordance with the present invention.

FIG. 2 illustrates clock distribution for chips 102. The controller chip 101 receives a bus clock (clk) 200 from the system clock distribution. In turn, the controller chip sends out 4 sets of clocks (clock signals) corresponding to the 4 signal buses 103 (see FIG. 1). The chips 102 corresponding to one signal bus 103 will use the same set of clocks. Each set of clocks consists of two clock lines. One clock line is referred to as the R clock 201. The R clock 201 starts from the controller chip 101 at point RB-n (for nth bus). The R clock signal 201 travels toward the storage chips 102 and reaches each kth storage chip 102 at point R-k. The R clock 201 is used by each of the storage chips 102 to generate an internal clock signal to synchronize a receiving latch (not shown) in the storage chip 102 with respect to the sending latch in the controller chip 101 to maximum the skew tolerance for the signal communication (signal bus 103) between the controller chip 101 and the storage chips 102.

Another clock line is referred to as the T clock line 210. The T clock line 210 is used by the storage chip 102 and the controller chip 101 to generate proper clock signals to synchronize a sending latch at the storage chip 102 with a receiving latch at the controller chip 101 to maximize the skew tolerance on the signal bus 103. The T clock line 210 starts from the controller chip 101 at TS-n (nth bus) and travels toward the storage chips 102. This section of the T clock line 210 is referred to as the TS line 203. When the TS line 203 reaches the last (kth) storage chip 102 in the bus 103, it will turn around and travel toward the controller chip 101. This second section of the T clock line 210 is referred to as the T clock 202. The T clock 202 reaches the kth storage chip 102 at point T-k. The T clock 202 arrives at the controller chip 101 at point TB-n (for nth bus). The phases at points TB-n of all four T clocks (for 4 buses) not only are adjusted to the same phase but are also synchronized with the specific edge of the sending clock of the controller chip 101 (only one PLL clock source among four buses). Therefore, in terms of clock phase, the four buses are essentially one bus as far as the controller chip 101 is concerned.

Figure 3:
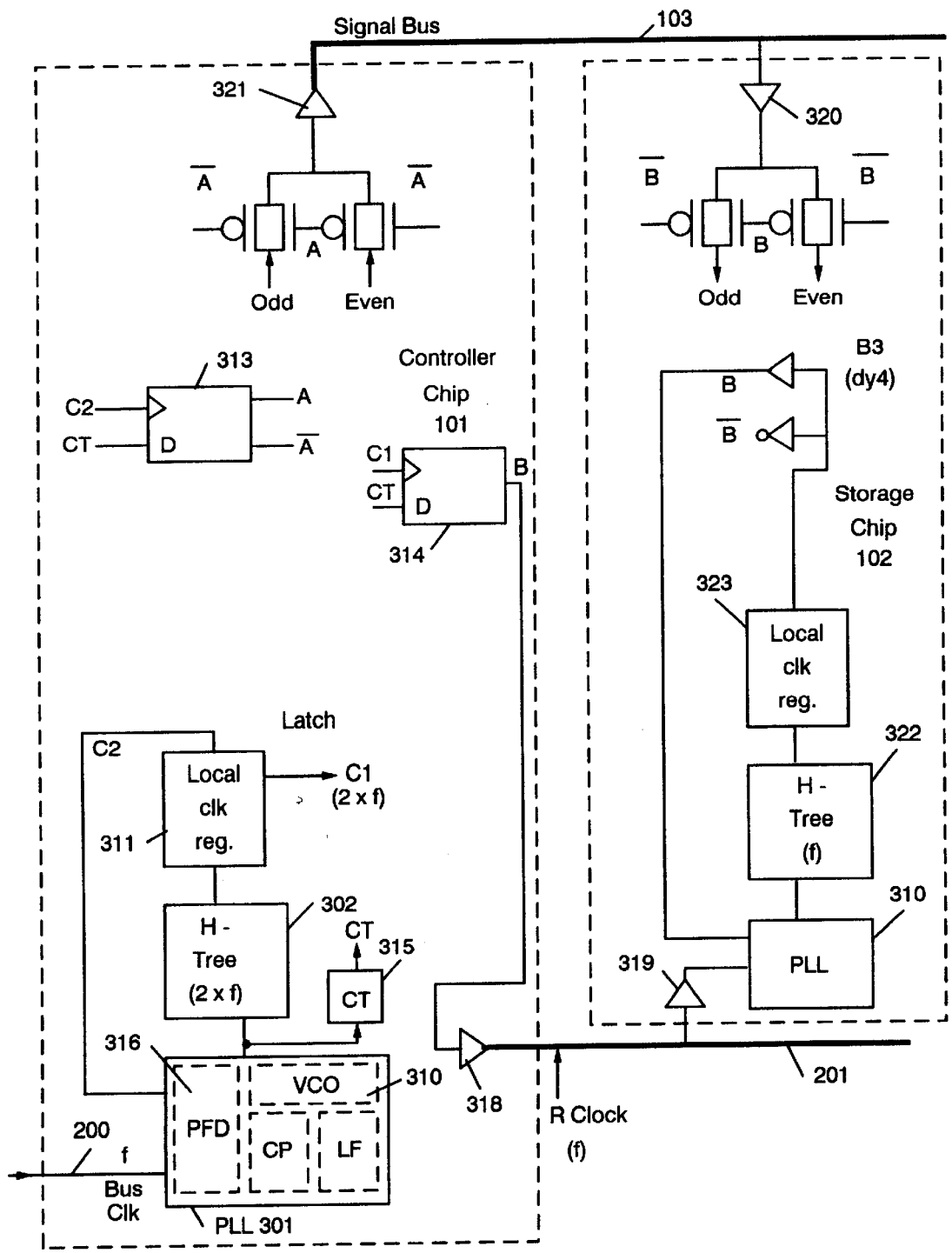
FIG. 3 illustrates generation, distribution and synchronization of the sending and receiving clocks (R clock) for communication from the controller chip to the storage chip.

The generations, distributions and synchronization of the R clock 201 for communication from the controller chip 101 to the storage chips 102 are illustrated in FIG. 3. Based on a bus clock 200 with a frequency f, a 2×f (2f) clock is generated from the VCO (voltage controlled oscillator) 310 of the PLL (phase locked loop) 301 on the controller chip 101, which also includes a charge pump (CP) and loop filter (LF). The clock (2f) is distributed with an H-tree 302 (or any clock distribution network) throughout the controller chip 101.

Figure 5:
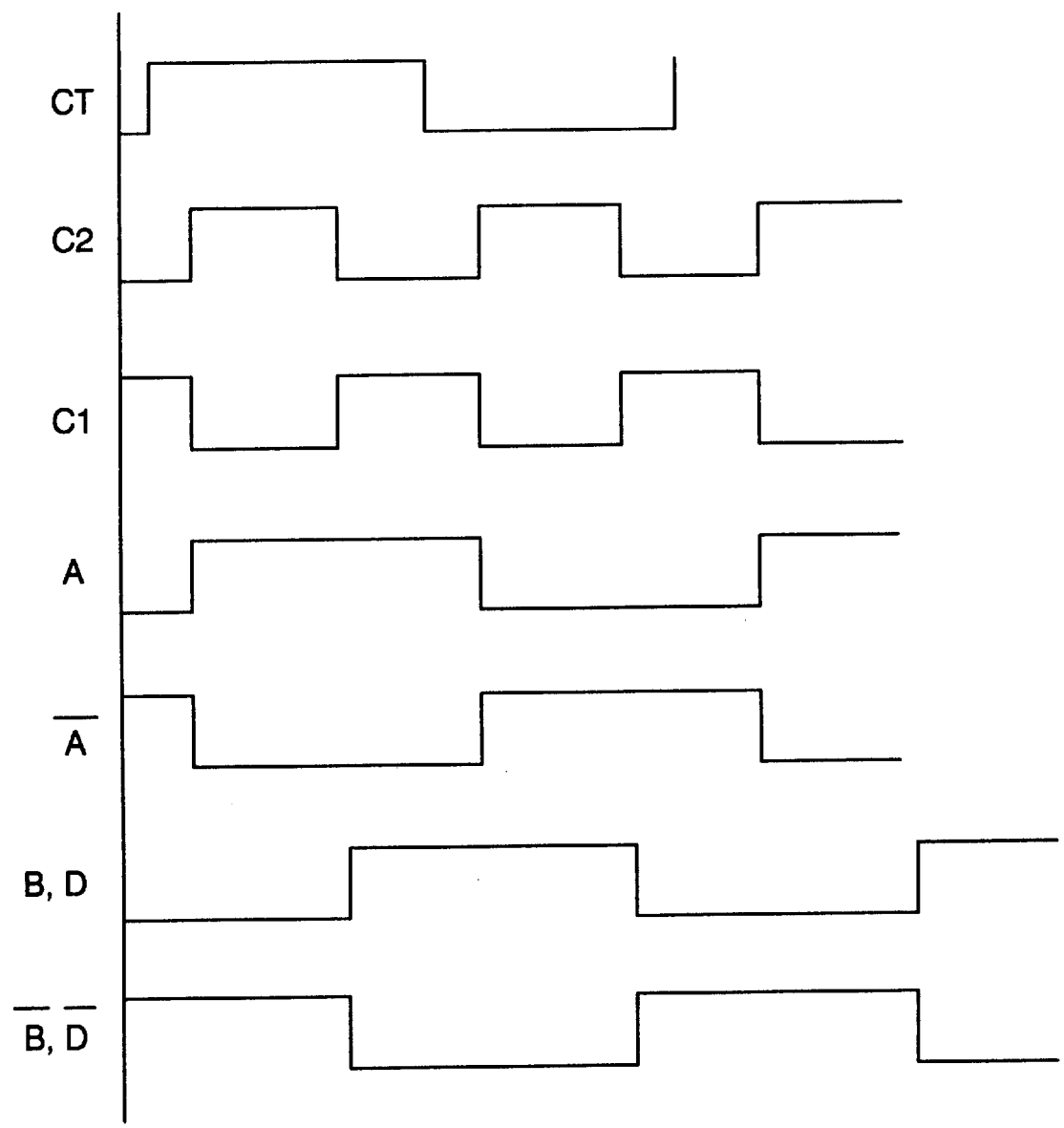
FIG. 5 illustrates timing diagrams for clocks CT, C2, C1, A, $\overline{A}$, B, D, $\overline{B}$ and $\overline{D}$.

The local clock regenerator 311 is located at the end of the H-tree 302 to boost the signal to drive more load. The outputs C2, C1 of the clock regenerator 311 are fed to two positive edge trigger d-latches 313, 314 as clock inputs. The positive edge trigger d-latch 313 is fed with C2 clock as clock input and CT as D input. The outputs of d-latch 313, A and its complement $\overline{A}$, are used as the launching clock for the signal bus 103 from controller chip 101 to storage chip 102. The d-latch 314 is fed with C1 and CT, respectively. The output B of the d-latch 314 is sent to storage chip 102 as R clock 201. The timing of C1, C2, CT, A, $\overline{A}$ and B is shown in FIG. 5. A divide by 2 counter 315 is used to derive the CT clock with frequency f. The main purpose of the CT clock is used to synchronize all d-latches related to the launching clock as well as the R clock for two or more signal buses.

The sending clock so generated is leading receiving clock (R) by 90 degrees with a frequency f. It is the ideal timing for sending clock signals of DDR (double data rate) with a frequency f.

The signal C2 is fed back to the phase frequency detector (PFD) 316 of the PLL 301 to lock in phase with the bus clock 200. Such synchronization with the bus clock 200 is required for the communication between the controller chip 101 and other chips 102 in the system. To compensate the driver delay of the signal path 103, a buffer 318 with delay dy1 equal to that of buffer 321 is placed in the R clock 201 path.

The receiving clock B and B complement ($\overline{B}$) at the storage chip 102, with a frequency f will be generated and synchronized with the R clock 201, based upon the PLL 310 or similar circuit at the storage chip 102. A buffer 319 with a delay dy2 is placed in the R clock 201 path to compensate for the delay of the receiver 320 (a delay dy2) of the signal path 103. H-tree 322 distributes the clock signal throughout chip 102, while local clock regenerator 323 boosts the power level of the signal.

Figure 4:
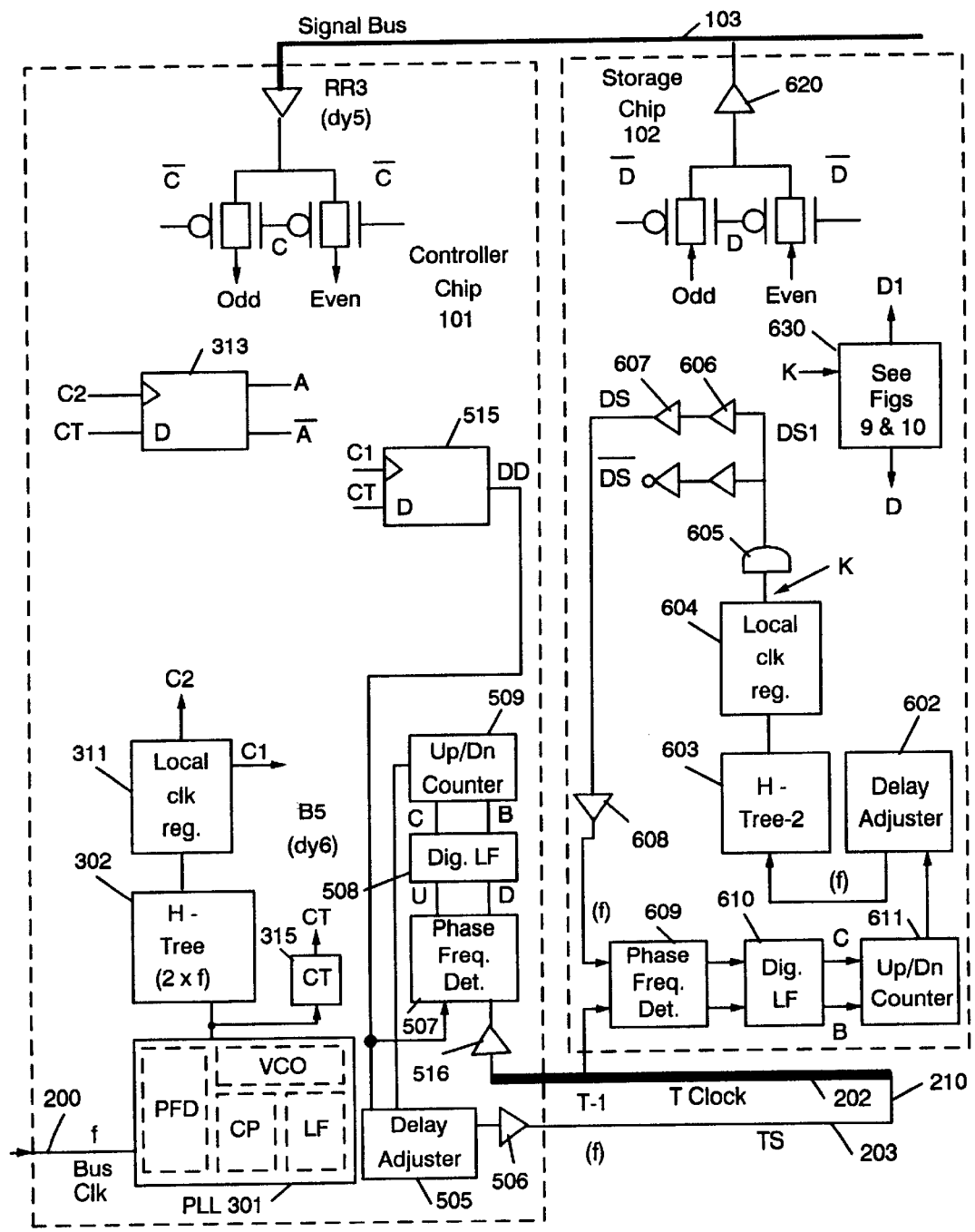
FIG. 4 illustrates the T clock clocking facilities for communication from a storage chip to the controller chip.

The clocking facilities for T clock 202 in FIG. 4 are divided into three portions. They are the clock facility at the controller chip 101, the clock distribution on package, and the clock facility at the storage chip 102.

The first portion of clocking facility is clock signal generation and distribution inside the controller chip 101. These facilities include PLL 301, H-tree 302, local clock regenerator 311 and d-latches 313 and 314. Comparing FIG. 4 to FIG. 3, it can be easily recognized that this portion of the facilities is similar for both the R clock 201 and the T clock 202 at the controller chip 101. The signal A from the output of the latch 313, along with its complement $\overline{A}$ are used as the receiving clock at the controller chip 101. The CT clock is used to maintain all four buses to be synchronous with respect to bus clock 200.

At the controller chip 101, the clock signal from d-latch 515 is fed into a digital delay adjuster 505 and then sent out with a driver 506 to the storage chips 102. This TS clock signal 203 reaches the last storage chip 102 and turns back and becomes the T clock 202 for the storage chips 102. As the T clock signal 202 enters the controller chip 101, it will flow through receiver 516 and feed into a phase frequency (freq.) detector (det.) 507 (PFD). Simultaneously, the clock signal from d-latch 515 is fed into the same phase frequency detector 507. The output signal of the phase frequency detector 507 in turn is fed to a digital loop filter (DLF) 508 and then an up/down counter 509. The output of the counter 509 is used to control the digital delay adjuster 505; the combined function of these four components (PFD 507, DLF 508, Counter 509 and Delay Adjuster 505) behaves like an all-digital PLL. It will align the two clock phases input to the phase frequency detector 507 by adding or subtracting delay on the path through the delay adjuster 505.

The working of such an all-digital PLL is described as follows. If the phase of the T clock signal 202 leads the reference signal (latch 515 output signal), a pulse will appear on one (U) of two outputs (U and D) of the phase frequency detector 507; otherwise, a pulse will appear on the D line. When the ratio of the number of the pulses appearing on the U line with respect to the total number of pulses (U and D) is above a defined ratio r1 then a pulse constant width will appear on the C (carry) line of the digital loop filter 508. If the ratio for the down line is above r1, then a signal will appear on the B output line of the loop filter 508. The pulse on the C (carry) line up counts the counter 509. The pulse on the B (borrow) line will down count the counter 509. The up count will increase the delay of the delay adjuster 505 on the clock path. Therefore, it reduces the leading angle of the T clock 202 phase and accomplishes the proper controlling function.

The components of the phase frequency detector 507, digital loop filter 508, up/down counter 509 and the digital delay adjuster 505 are further described:

Phase frequency detector (PFD) 507—A conventional phase frequency detector with two fast latches may be used. There are two output lines for such a detector. The detector 507 will generate a pulse on one output line if the signal phase is leading the reference signal phase. Otherwise, it will generate a pulse on the other output line.

Figure 7:
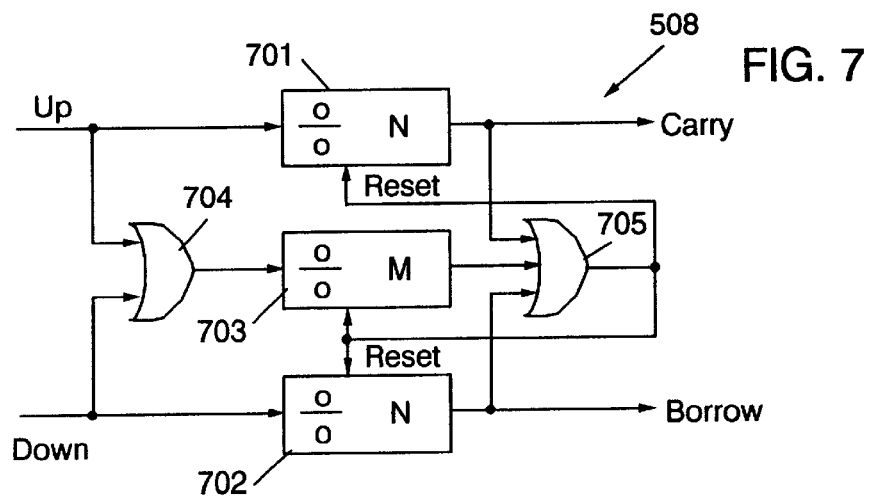
FIG. 7 illustrates a digital loop filter.

Digital Loop Filter 508—A conventional N before M counter is used as a digital loop filter. The schematic of the digital loop filter is shown in FIG. 7. It consists of three counters. Two divide-by-N counters 701, 702 receive signals from the Up (U) and the Down (D) output lines of the PFD 507. The output of a 2-ways OR gate 704 is fed to the third counter, a divide-by-M counter 703. A 3-ways OR gate 705 receives inputs from the outputs of all three counters 701–703. The output of OR gate 705 is fed to the reset inputs of all three counters 701–703. In digital loop filter 508, M is bigger N. The ratio r1 described earlier is defined as N/M. For example, if M is equal to 10, N is 7. Then a Carry signal pulse will generate for the case in 10 consecutive pulses to the phase frequency detector, at least 8 pulses will generate on the up output line of the PFD 507.

Figure 8A:
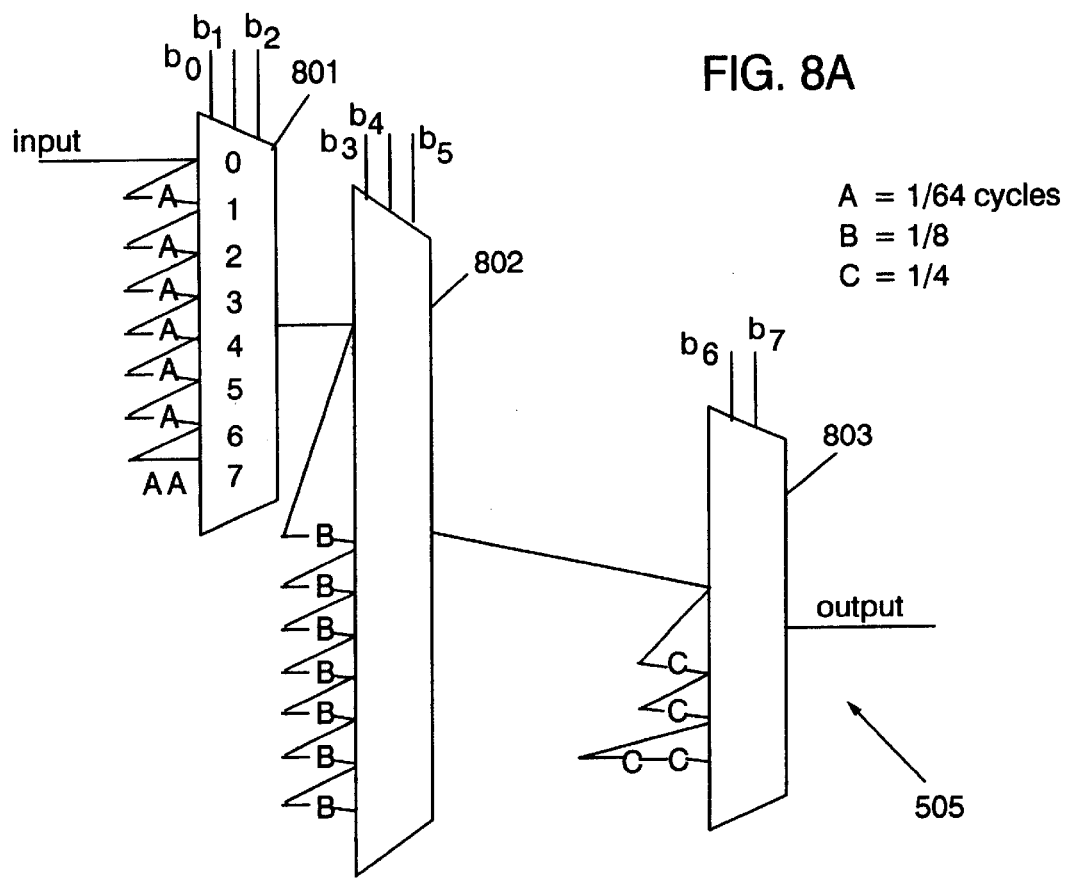
FIG. 8A illustrates a digital delay adjuster.

Digital Delay Adjuster 505—A novel digital delay adjuster is further illustrated in FIG. 8A. The novel digital delay adjuster 505 is formed by three multiplexors 801–803 (8, 8 and 4 ways).

Multiplexor (Mux) 801 is an 8-way multiplexor. Eight buffers (A as shown in FIG. 8), each of which has a delay of 1/64 of a cycle as an example are connected in series. The input of the first buffer set in the series and seven outputs of eight buffer sets will be the inputs for the multiplexor 801. Three control lines of multiplexor 801 are connected to the bit line outputs of the ripple counter 509. The inputs will be so selected that the delay from the first input of Mux 801 to the output of the Mux 801 will increase monotonously (the delay is proportional to bit count) with respect to the bit count of the counter 509.

In FIG. 8A, the output of Mux 801 and seven outputs of the buffer sets (B) are chosen as the inputs to Mux 802. Again, the three control lines of this Mux 802 will be connected to the corresponding bit line outputs of the ripple counter 509 in FIG. 4. The input of the Mux 802 will be so selected that the delay of Mux 802 from first input to the Mux 802 output will increase monotonously with respect to the bit count of the counter 509.

Multiplexor (Mux) 803 is a 4-way multiplexor. Four buffers sets with a delay of ¼ of cycle and the output of the Mux 802 are connected in series. Two input lines are required for a 4-way mux. The inputs of Mux 803 are selected similar to those of Mux 801 and Mux 802.

The input of the first buffer set (A) in Mux 801 is the input of the delay adjuster 505. The output of the Mux 803 is the output of the delay adjuster 505. Eight control lines of the three muxes 801–803 become the control lines of the delay adjuster 505. The delay introduced by the delay adjuster 505 monotonously increases with respect to the bit count of the control lines from counter 509.

Figure 8B:
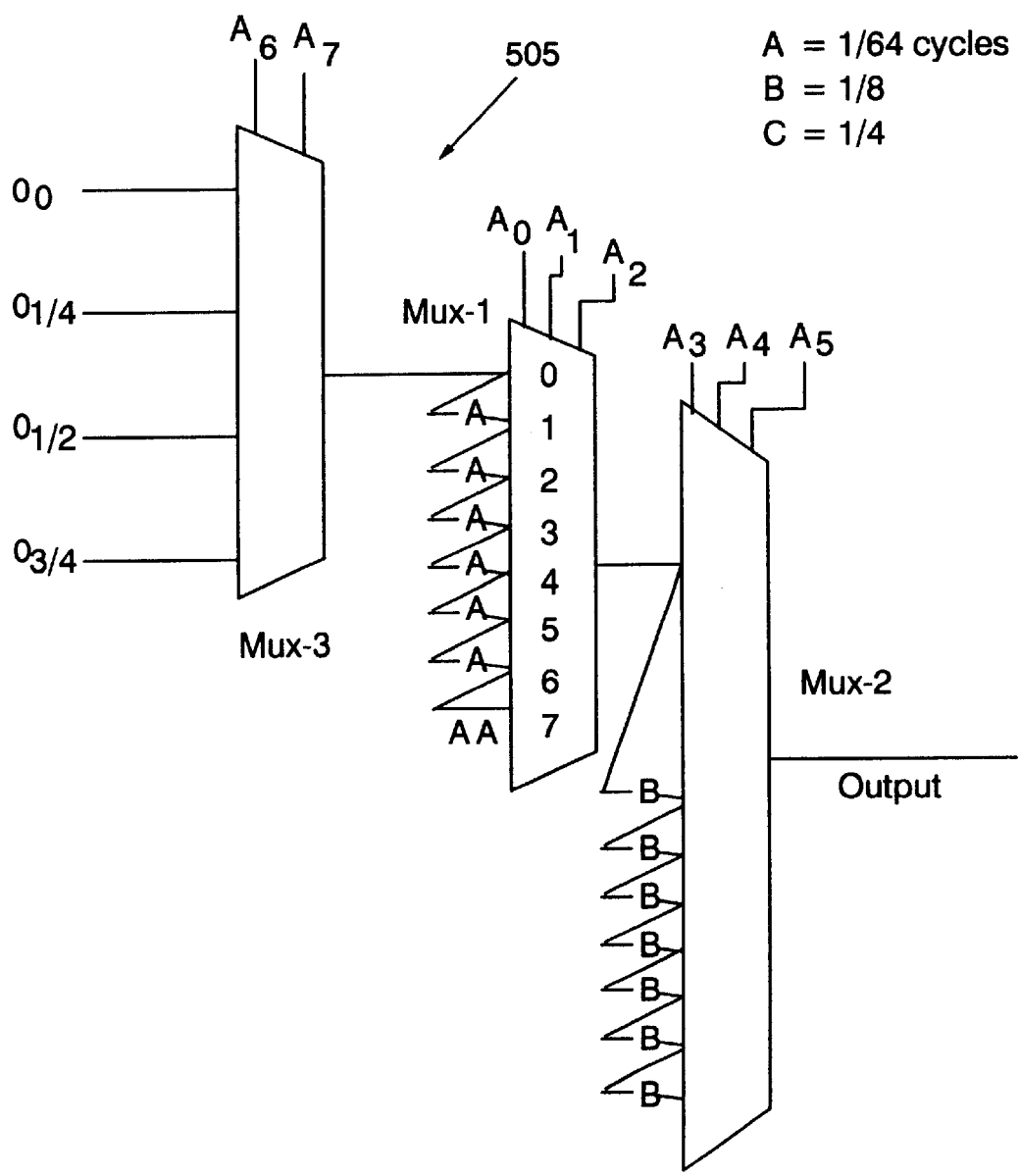
FIG. 8B illustrates an alternative embodiment of the digital delay adjuster.

An alternative implementation of Mux 803 is to use oscillating waveforms with a phase angle separating by ¼ cycle instead of buffer set C. These waveforms can be derived from buffering the oscillating waveform at various points of the ring oscillator of the VCO 510 in the PLL 301. FIG. 8B illustrates the alternate implementation of the digital delay adjuster 505.

Figure 12:
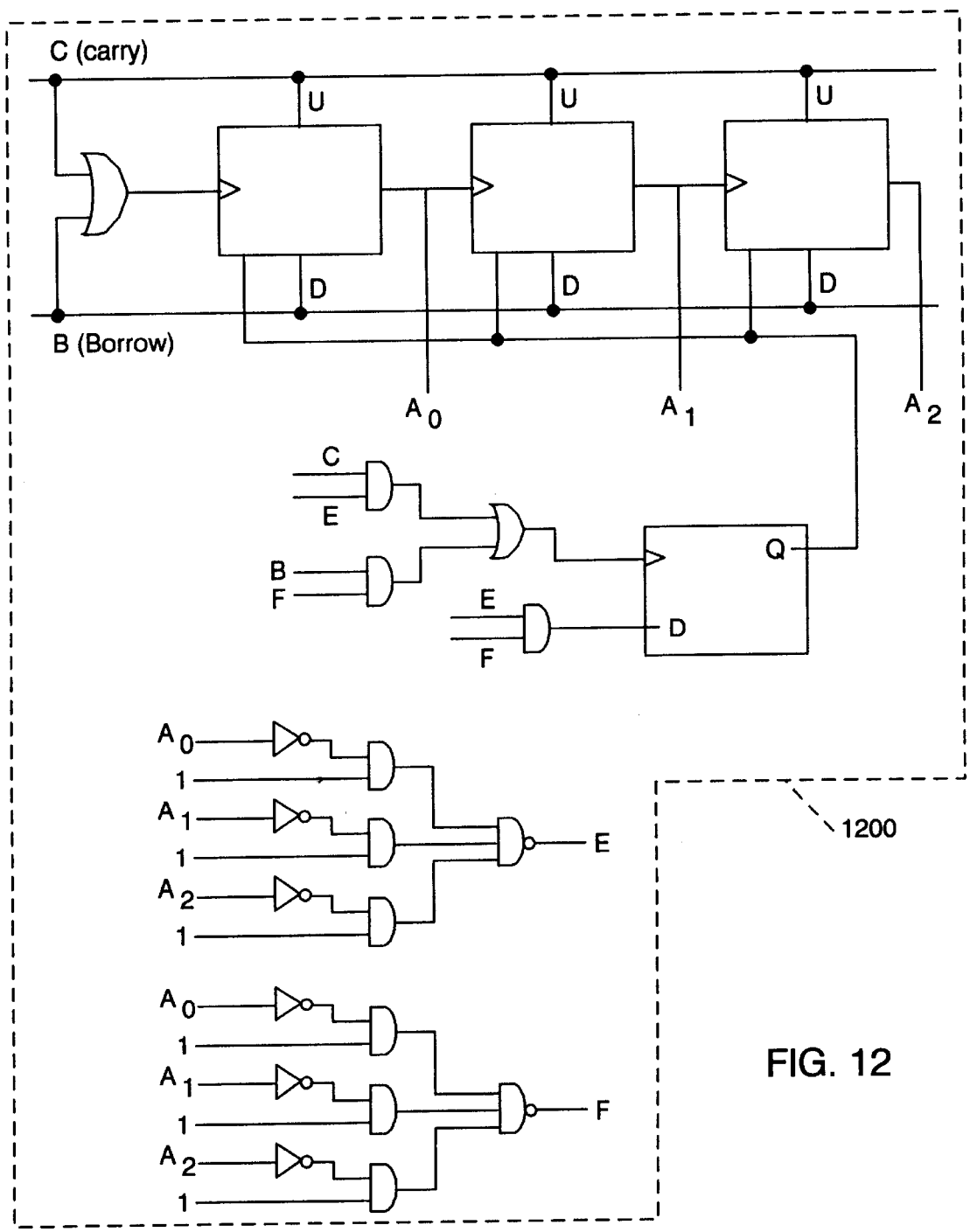
FIG. 12 illustrates a counter.
Figure 13A:
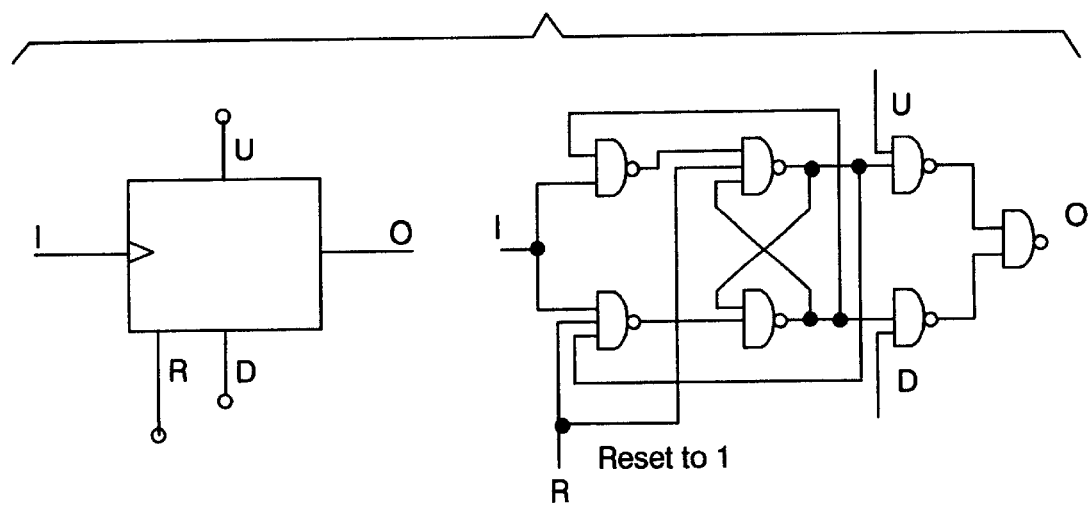
FIGS. 13A and 13B illustrate an up/down ripple counter.
Figure 13B:
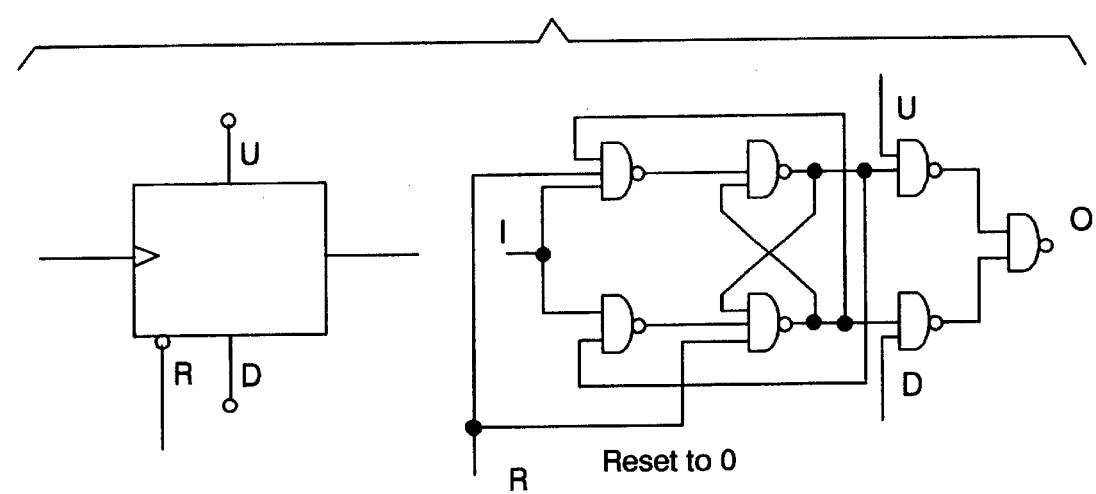

Up/Down Ripple Counter 509 uses a novel reset feature. A JK flip flop will be used as the basic building block of the up/down ripple counter 509. The counter used in combination with the delay adjuster is 8 bits. As an example for the simplicity of discussion, a three bits up/down counter 1200 with reset will be described with respect to FIG. 12 instead. The counter 1200 will reset to a half delay point (110 for counter 1200) when the counter 1200 receives a pulse from the Borrow line after the counter 1200 becomes empty or when the counter 1200 receives a pulse from the Carry line after the counter 1200 is filled. Such logic of each reset can be implemented with several 2-way NAND gates and a positive edge trigger D latch as shown in FIG. 12. The total delay of the delay adjuster 505 is 2 cycles. A half delay point corresponds to one cycle. For the delay adjuster 505, an 8 bits counter with a reset point (11111100) is needed. Such reset will insure the delay adjuster 505 to operate in the middle of the delay range.

In FIG. 4, the signal from the T clock 202 at the storage chip is fed into the phase frequency detector 609 and digital loop filter 610. The design of the digital filter 610 is similar to that as depicted in FIG. 7. The outputs (C and B) of the digital filter 610 are fed into an Up/Dn counter 611, then to a digital delay adjuster 602 (as shown in FIGS. 8A and 8B), then H-Tree 603 (different from that used by the R clock), local clock regenerator 604, AND gate 605, buffers 606–608 and finally back to frequency detector 609. The phase frequency detector 609 compares the phase of its two inputs and generates an output. The combined operations of phase frequency detector 609, digital loop filter 610, Up/Dn counter 611 and digital delay adjuster 602 will insert a proper amount of delay into the path to synchronize these phases of the two input signals for phase frequency detector 609. The buffer 614 is used to compensate the delay of 612. The DS clock signal and its complement $\overline{DS}$ generated will be in phase with the T clock 202 at the storage chip 102.

Figure 9:
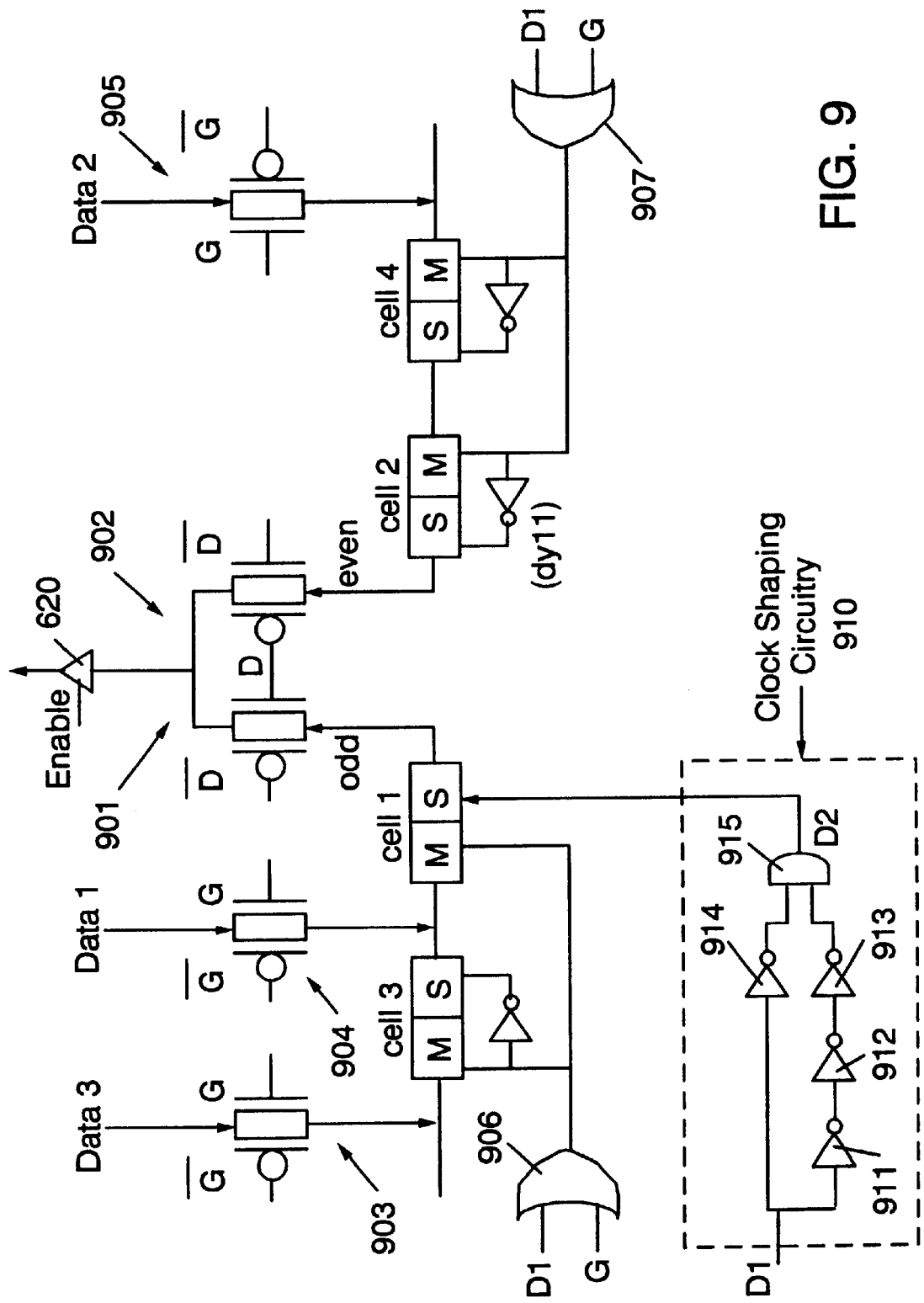
FIG. 9 illustrates a transfer shift register.
Figure 10:
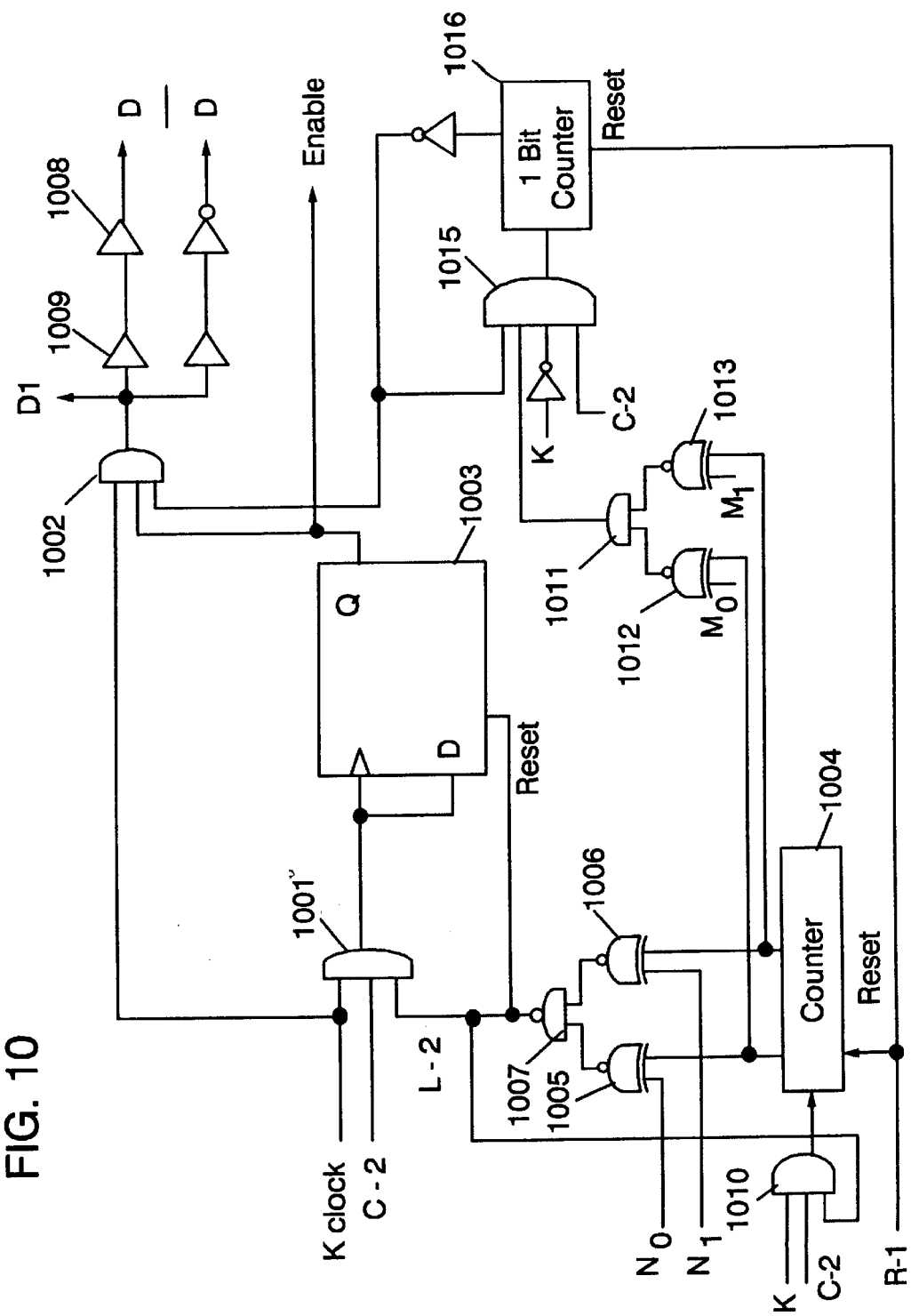
FIG. 10 illustrates the D clock generation circuit.

Based upon these two clocks, a new D and D1 clock signals (as shown in FIGS. 9 and 10) will be generated. The D and D1 clocks are used as the launching clocks to send signals from the storage back chip 102 to the controller chip 101. The generation of D and D1 clocks will be explained in the next several paragraphs.

The chip 102 is designed to be controlled by the logic completely run under R clock (or T clock). The other clock T (or R) clock, runs passively. After all activity is completed under the R clock, the data to be transferred will be placed in a transfer register. Release the control of the transfer register to the T clock. At the same time, a finite length pulse train based upon the transfer requirement will be generated and synchronized with the T clock 202. The generated pulse train will pick up the control of the transfer register and send the data out.

Transfer Shift Register—A 4 cells for 3 data inputs transfer register is shown in FIG. 9. Each cell has a master (M) slave (S) register. Cells 1, 3 and 4 receive data for Data 1, 3 and 2 respectively. The slave latch of cell 1 is fed to the transmission gate 901 for odd data transmission. The slave latch of cell 2 is fed to the transmission gate 902 for even data transmission. Other ends of these two transmission gates are fed to driver 620. Four gates of these two transmission gates are controlled by clock signals D and D complement. D clock is a set of clock pulses synchronized with the T clock 202. The D clock generation circuit is shown in FIG. 10. An enable signal is used to activate and de-activate the driver 620.

The paths through which data is fed to the master slave latch of each cell are controlled by the transmission gates 903–905 with controlled signals G and G complement. G is derived from the storage chip logic. It signifies the availability of data from the memory cell of the storage chip. The clock lines of the master slave shift registers are fed by two 2-way OR gates 906 and 907. The inputs for gates 906, 907 are D1 and G. The G input is used to latch the data in the master latch during the transfer register is fed with data from the paralleled inputs. The D1 clock is used to shift data to feed to the driver 620 during data transmission from the storage chip 102 to the controller 101. The clock line for the slave latch of cell 1 is fed by a clock window shaping circuitry 910 as shown in FIG. 9.

Figure 6:
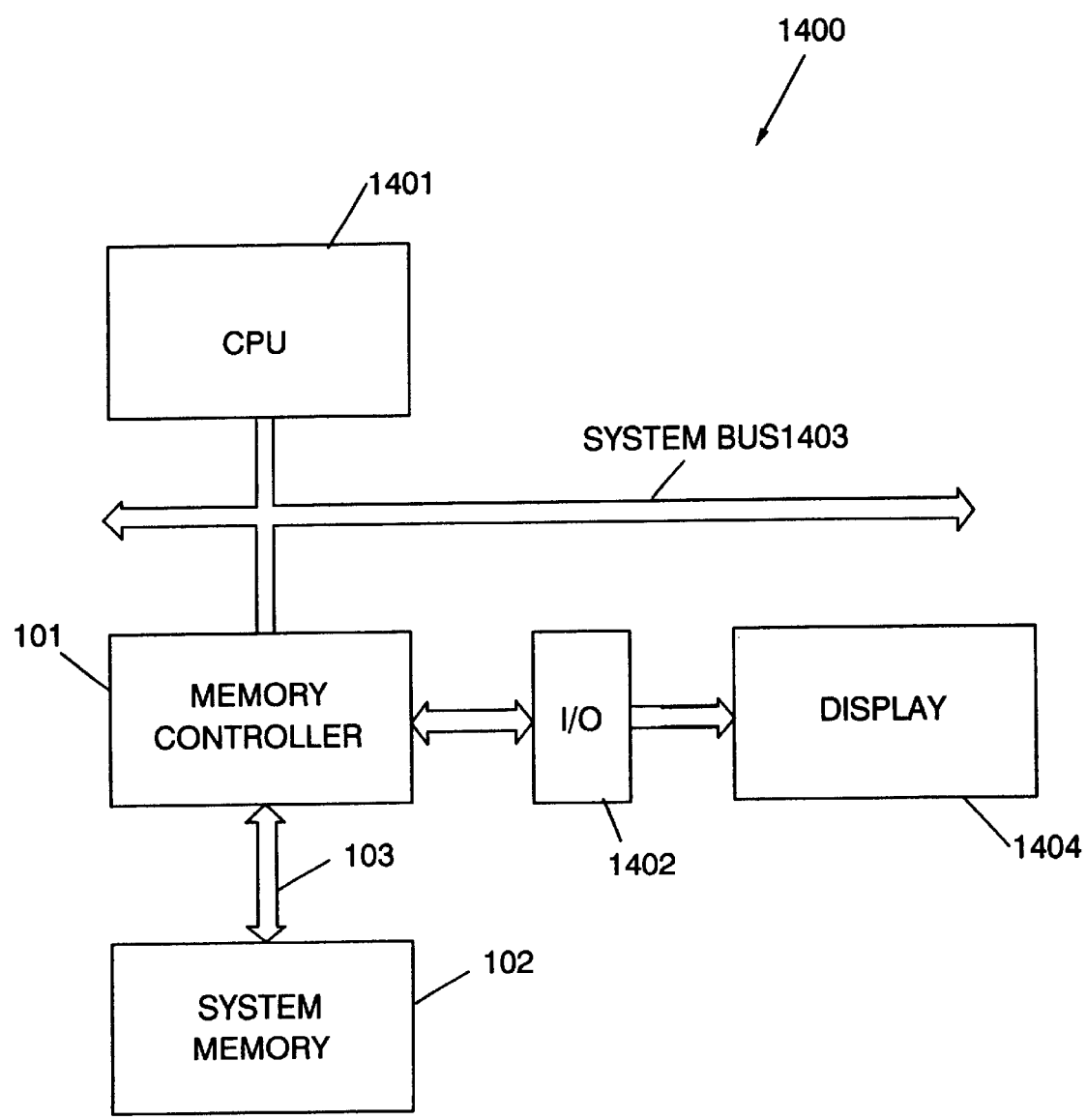
FIG. 6 illustrates a data processing system configured in accordance with the present invention.

Clock Pulse Generation Circuit for D and D1—A 2-bit (easily extended to n bits) clock pulse generation circuit as an example is described here. The schematic of the circuit is shown in FIG. 10. Combining the T clock synchronization circuit as shown in FIGS. 4 and 6 and the clock pulse generating circuit in FIG. 10, a D clock, D1 clock and a driver enable signal will be generated. As described previously, these signals are used to launch the data signal from the storage chip 102 to the controller chip 101.

The D clock generating circuit of FIG. 10 includes two major parts. One part is a synchronizing circuit including two AND gates 1001 and 1002 and positive edge trigger D latch 1003 with reset. K clock from the output of local clock regenerator 604 (FIG. 4) is fed into AND gate 1001, along with the control signal C-2 and a signal from the counter 1004. C-2 is derived from storage chip logic (R clock region). It signifies the availability of data for sending. K clock is a free running clock derived from the T clock synchronizing circuit as shown in FIG. 4. The difference from the D clock to the K clock is the sum of the delay of AND gate 1002, buffers 1008 and 1009. This sum of delay is the same as that of AND gates 605 and buffers 606 and 607, between DS and K points of T clock synchronizing circuit (as shown in FIG. 4). The buffer 608 in FIG. 4 is used to compensate for the driver 620 delay. Therefore the D clock is synchronized with the T clock.

Another part of the circuit in FIG. 10 is the clock pulse number controlling circuitry, whose function is to determine the number of pulses (bits) to be sent out through the driver 620 according to the pre-determined number by the logic. This circuit will generate the driver 620 enable signal and the clock signal for transmission gates 901, 902, and shift registers 1, 2, 3, 4 in FIG. 9. The circuit generating driver enable signal includes a ripple counter 1004 with Reset, two AND gates 1005, 1006 and one NAND gate 1007. The input of the counter 1004 is the signal from the D clock. One input of the two AND gates 1005, 1006 is connected to the output lines of counter 1004. The other inputs of these AND gates are derived from the number(N0, N1). The number (N0, N1) is equal to the number $$\frac{Nk}{2} + 1,$$

where Nk is the number of bits to be sent. The outputs of these two Exclusive Nor gates 1005, 1006 are fed to NAND gate 1007. The output of the NAND gate 1007 is fed to the Reset of the D latch 1003 and the AND gate 1001. The rest of the circuit in FIG. 10 including the AND gate 1001 and the d-latch 1003 are used to generate proper number $$\left(\frac{Nk}{2}\right)$$

of the clock pulses for number of signals to be sent.

Figure 11:
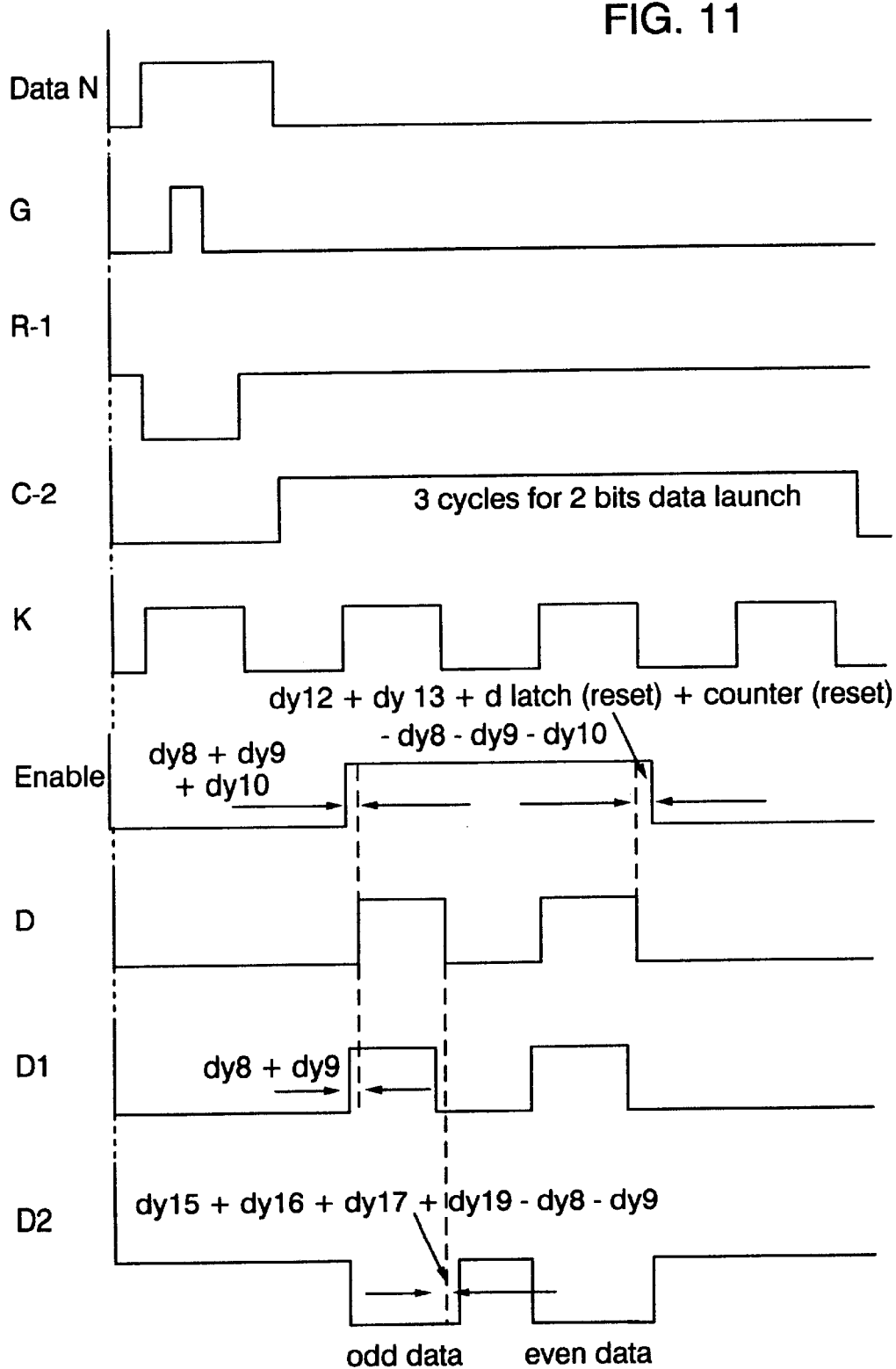
FIG. 11 illustrates a timing diagram for the launching of a driver signal.

The timing of all the signals for the case of launching a driver signal from driver 620 (see FIG. 4) is illustrated in FIG. 11. Also referring to FIG. 9, when the storage chip 102 is ready to launch a response to the controller chip 101, it begins by placing data in the parallel inputs Data 1, Data 2, Data 3 of the transfer shift register. Then a positive single pulse in control line G will allow the signal to pass through the transmission gates 903–905. And at the same time, the data is latched into the transfer shift register (cells 1–4). Data M0 and M1, representing half of the number of pulses (Nk) to be sent out to the signal line, are delivered to the Exclusive Nor gates 1012 and 1013, as shown in FIG. 10. For example, if M0=1 and M1=0, it means two pulses are to be sent. Data N0, N1, representing $$\frac{Nk}{2} + 1$$

are delivered to Exclusive Nor gates 1005 and 1006. The control line R-1 is set to a own level momentarily. Such a signal will clear the counter 1004 and 1016 to zero. And at the same instant, the output of NAND gate 1007 will rise. That in turn releases the D latch 1003 (reset after the counter 1004 completed the count at the last signal launch) and places a '1' into the 1001 input. The C-2 line becomes the sole control line to determine whether the K clock can pass through AND gates 1001 and 1002. Any positive transition edge of the K clock pulse will pass through gate 1001 and set the D latch 1003 after signal C-2 goes high as shown in FIGS. 10 and 11. The output of D latch 1003 will place a '1' at one of the inputs of AND gate 1002. The clearing of counter 1016 will also place another '1' at the other input of AND gate 1002. Any positive edge of the K clock will go through AND gate 1002 and generate the D1 and D signals.

The d-latch output also serves as the enable signal for the driver 620. When the counter 1004 reaches the count $$\frac{Nk}{2}$$

which matches data M0, M1, such a match will place a '1' from AND gate 1011 to the input of AND gate 1015. This, in turn, starts the counting for counter 1016 from $\overline{K}$. After one count, the output of inverter 1014 will turn off AND gates 1002 and close AND gate 1015. The number of clock pulse for D, $\overline{D}$, will therefore be equal to $$\frac{Nk}{2}.$$

When the count of counter 1004 reaches $$\frac{Nk}{2}+1,$$

the output of NAND gate 1007 will reset the d-latch, and close AND gates 1001 and 1010. The reset of d-latch will turn off the enable signal.

To insure the data transmitted by the driver 620 will indeed synchronize with the T clock and not be impeded by the enable signal and data transfer mechanism of the transfer register, the Enable signal window has to overlap the D clock window, and the window of the signal presented to the even and odd transmission gates 901, 902 from the slave latches of cell 1 and cell 2 must also overlap the D clock window.

The leading edge of the Enable signal leads the leading edge of the first pulse of the D clock by a sum of delays dy8, dy9 and dy10. The trailing edge of the Enable signal lags the trailing edge of the last pulse of the D clock by a sum of delays dy12+dy13+(delay of counter reset)+(delay of D latch reset)-dy8-dy9-dy10.

The delay dy8 is the delay in buffer 1008, the delay dy9 is the delay in buffer 1009, the delay dy10 is the delay in AND gate 1002, the delay dy 12 is the delay in NAND gate 1007, the delay dy13 is the delay in AND gate 1006, the delay dy15 is the delay in inverter 911 in clock shaping circuitry 910, the delay dy16 is the delay in inverter 912 in clock shaping circuitry 910, the delay dy17 is the delay in inverter 913 in clock shaping circuitry 910, the delay dy18 is the delay in inverter 914 in clock shaping circuitry 910, and the delay dy19 is the delay in AND gate 915 within clock shaping circuitry 910.

Like all shift registers, the signal window in the latch lasts one cycle. The D clock signal window to open odd transmission gate 901 in FIG. 9 lasts only half a cycle. This half cycle is coincided with the second half of the cycle of the signal window of the slave latch in the cell 1. Clock shaping circuitry 910 is used to insure the trailing edge of the slave latch signal window lags the D clock by a delay of dy15+dy16+dy17+dy19-dy8-dy9. The D clock signal window to open the even transmission gate 902 is coincided with first half of the cycle of the signal window of the slave latch of cell 2; D1 clock is used for the latch clock. The leading edge of the latch clock window leads that of the D clock by a delay of dy8+dy9.

FIG. 6 illustrates data processing system 1400 with CPU 1401 coupled to system bus 1403. The present invention resides in memory controller 101 coupled to system memory chips 102 via bus 103, as described herein. Memory controller may also be coupled to Display 1404 by I/O 1402.

Although the present invention and its advantages have been described in detail, it should be understood that various changes, substitutions and alterations can be made herein without departing from the spirit and scope of the invention as defined by the appended claims.

What is claimed is:

1. A memory system comprising:

a memory controller;

a first memory device;

a first data bus for transporting data between the memory controller and the first memory device;

a first clock bus, carrying a first clock signal, for facilitating a transfer of the data from the memory controller to the first memory device; and a second clock bus, carrying a second clock signal, facilitating a transfer of the data from the first memory device to the memory controller, wherein the first and second clock buses are separate buses, wherein the first and second clock signals are separately generated, wherein the first clock signal synchronizes a receipt of the data by the first memory device with sending of the data by the memory controller as the data is being transported via the first data bus, wherein the second clock signal synchronizes a receipt of the data by the memory controller with sending of the data by the first memory device as the data is being transported via the first data bus, wherein the first clock signal synchronizes a receiving latch in the first memory device with a sending latch in the memory controller.

2. The memory system as recited in claim 1, wherein the second clock signal synchronizes a sending latch in the first memory device with a receiving latch in the memory controller.

3. The memory system as recited in claim 2, further comprising circuitry for synchronizing the first and second clock buses to a system clock received by the memory controller.

4. The memory system as recited in claim 1, further comprising circuitry for synchronizing the first and second clock buses to a system clock received by the memory controller.

5. The memory system as recited in claim 1, further comprising a second memory device coupled to the first data bus, wherein the first clock signal synchronizes a receipt of the data by the second memory device with sending of the data by the memory controller as the data is being transported via the first data bus, and wherein the second clock signal synchronizes a receipt of the data by the memory controller with sending of the data by the second memory device as the data is being transported via the first data bus.

6. A memory system comprising:

a memory controller;

a first memory device;

a first data bus for transporting data between the memory controller and the first memory device;

a first clock bus, carrying a first clock signal, for facilitating a transfer of the data from the memory controller to the first memory device; and a second clock bus, carrying a second clock signal, facilitating a transfer of the data from the first memory device to the memory controller, wherein the first and second clock buses are separate buses, wherein the first and second clock signals are separately generated;

a second memory device coupled to the first data bus, wherein the first clock signal synchronizes a receipt of the data by the second memory device with sending of the data by the memory controller as the data is being transported via the first data bus, and wherein the second clock signal synchronizes a receipt of the data by the memory controller with sending of the data by the second memory device as the data is being transported via the first data bus, wherein the first clock signal synchronizes a receiving latch in the second memory device with the sending latch in the memory controller.

7. The memory system as recited in claim 6, wherein the second clock signal synchronizes a sending latch in the second memory device with the receiving latch in the memory controller.

8. The memory system as recited in claim 7, further comprising circuitry for synchronizing the first and second clock buses to a system clock received by the memory controller.

9. The memory system as recited in claim 8, wherein the first and second clock buses are coupled to the memory controller, the first memory device, and the second memory device.

10. The memory system as recited in claim 9, wherein the second clock signal travels from the memory controller first to the second memory device and then subsequently to the first memory device, wherein the second memory device is located more distant from the memory controller on the signal bus than the first memory device.

11. A memory system comprising:
 a memory controller;
 a first memory device;
 a first data bus for transporting data between the memory controller and the first memory device;
 a first clock bus, carrying a first clock signal, for facilitating a transfer of the data from the memory controller to the first memory device;
 a second clock bus, carrying a second clock signal, facilitating a transfer of the data from the first memory device to the memory controller, wherein the first and second clock buses are separate buses, wherein the first and second clock signals are separately generated;
 a second memory device;
 a second data bus for transporting data between the memory controller and the second memory device;
 a third clock bus for facilitating a transfer of the data from the memory controller to the second memory device; and
 a fourth clock bus facilitating a transfer of the data from the second memory device to the memory controller, wherein the third and fourth clock buses are separate buses and are separate buses from the first and second buses.

12. The memory system as recited in claim 11, wherein the third clock bus carries a third clock signal that synchronizes a receipt of the data by the second memory device with sending of the data by the memory controller as the data is being transported via the second data bus, wherein the fourth clock bus carries a fourth clock signal that synchronizes a receipt of the data by the memory controller with sending of the data by the second memory device as the data is being transported via the second data bus.

13. The memory system as recited in claim 12, wherein the third clock signal synchronizes a receiving latch in the second memory device with a sending latch in the memory controller, wherein the fourth clock signal synchronizes a sending latch in the second memory device with a receiving latch in the memory controller.

14. The memory system as recited in claim 13, further comprising circuitry for synchronizing the third and fourth clock buses to a system clock received by the memory controller.

15. A data processing system, comprising:
 a processor;
 a system bus operable for carrying a system clock;
 a memory system coupled to the processor via the system bus, said memory system further comprising:
  a memory controller coupled to the system bus and operable for receiving the system bus;
  a first memory device;
  a first data bus coupling the first memory device to the memory controller and operable for transporting data between the memory controller and the first memory device;
  a first clock bus, carrying a first clock signal, for facilitating a transfer of data from the memory controller to the first memory device; and
  a second clock bus, carrying a second clock signal, facilitating a transfer of data from the first memory device to the memory controller, wherein the first and second clock buses are separate buses, wherein the first and second clock signals are separately generated, wherein the first clock signal synchronizes a receipt of data by the first memory device with sending of data by the memory controller as data is being transported via the first data bus, wherein the second clock signal synchronizes a receipt of data by the memory controller with sending of data by the first memory device as data is being transported via the first data bus, wherein the first clock signal synchronizes a receiving latch in the first memory device with a sending latch in the memory controller, wherein the second clock signal synchronizes a sending latch in the first memory device with a receiving latch in the memory controller.

16. The data processing system as recited in claim 15, further comprising circuitry for synchronizing the first and second clock signals to the system clock received by the memory controller.

17. The data processing system as recited in claim 15, further comprising circuitry for synchronizing the first and second clock buses to a system clock received by the memory controller.

18. The data processing system as recited in claim 17, further comprising a second memory device coupled to the first data bus, wherein the first clock signal synchronizes a receipt of data by the second memory device with sending of data by the memory controller as data is being transported via the first data bus, and wherein the second clock signal synchronizes a receipt of data by the memory controller with sending of data by the second memory device as data is being transported via the first data bus.

19. A data processing system, comprising:
 a processor;
 a system bus operable for carving a system clock;
 a memory system coupled to the processor via the system bus, said memory system further comprising:
  a memory controller coupled to the system bus and operable for receiving the system bus;
  a first memory device;
  a first data bus coupling the first memory device to the memory controller and operable for transporting data between the memory controller and the first memory device;

a first clock bus, carrying a first clock signal, for facilitating a transfer of data from the memory controller to the first memory device;

a second clock bus, carrying a second clock signal, facilitating a transfer of data from the first memory device to the memory controller, wherein the first and second clock buses are separate buses, wherein the first and second clock signals are separately generated;

circuitry for synchronizing the first and second clock signals to the system clock received by the memory controller; and a second memory device coupled to the first data bus, wherein the first clock signal synchronizes a receipt of data by the second memory device with sending of data by the memory controller as data is being transported via the first data bus, and wherein the second clock signal synchronizes a receipt of data by the memory controller with sending of data by the second memory device as data is being transported via the first data bus, wherein the first clock signal synchronizes a receiving latch in the second memory device with the sending latch in the memory controller, wherein the second clock signal synchronizes a sending latch in the second memory device with the receiving latch in the memory controller.

20. The data processing system as recited in claim 19, wherein the first and second clock buses are coupled to the memory controller, the first memory device, and the second memory device.

21. The data processing system as recited in claim 20, wherein the second clock signal travels from the memory controller first to the second memory device and then subsequently to the first memory device, wherein the second memory device is located more distant from the memory controller on the signal bus than the first memory device.

22. The data processing system as recited in claim 21, further comprising:

a third memory device;

a second data bus for transporting data between the memory controller and the third memory device;

a third clock bus for facilitating a transfer of the data from the memory controller to the third memory device; and a fourth clock bus facilitating a transfer of the data from the third memory device to the memory controller, wherein the third and fourth clock buses are separate buses and are separate buses from the first and second buses.

23. The data processing system as recited in claims 22, wherein the third clock bus carries a third clock signal that synchronizes a receipt of the data by the third memory device with sending of the data by the memory controller as the data is being transported via the second data bus, wherein the fourth clock bus carries a fourth clock signal that synchronizes a receipt of the data by the memory controller with sending of the data by the third memory device as the data is being transported via the second data bus.

24. The data processing system as recited in claim 23, wherein the third clock signal synchronizes a receiving latch in the third memory device with a sending latch in the memory controller, wherein the fourth clock signal synchronizes a sending latch in the third memory device with a receiving latch in the memory controller.

25. A method for transporting data in a memory system having a data bus coupled between a memory controller and a first memory device comprising the steps of:

generating a first clock signal;

communicating the first clock signal on a first clock bus coupled between the memory controller and first memory device;

synchronizing a transfer of data from the memory controller to the first memory device with the first clock signal;

generating a second clock signal separately from the first clock signal;

communicating the second clock signal on a second clock bus coupled between the memory controller and first memory device, wherein the first and second clock buses are separate buses; and synchronizing a transfer of data from the first memory device to the memory controller with the second clock signal, wherein the step of communicating the first clock signal further comprises the step of:

sending the first clock signal on the first clock bus from the memory controller to the first memory device, wherein the step of communicating the second clock signal further comprises the step of:

sending the second clock signal on the second clock bus from the first memory device to the memory controller, wherein the step of synchronizing the transfer of data from the memory controller to the first memory device with the first clock signal further comprises the step of:

synchronizing an operation of a first receiving latch in the first memory device with an operation of a first sending latch in the memory controller.

26. The method as recited in claim 25, wherein the first and second clock signals are separately generated but are synchronized with each other.

27. The method as recited in claim 25, wherein the step of synchronizing the transfer of data from the first memory device to the memory controller with the second clock signal further comprises the step of:

synchronizing an operation of a second sending latch in the first memory device with an operation of a second receiving latch in the memory controller.

28. The method as recited in claim 27, further comprising the step of synchronizing the first and second clock signals with a system clock signal received by the memory controller.

29. A system for transporting data in a memory system, comprising:

means for coupling a data bus between a memory controller and a first memory device;

means for generating a first clock signal;

means for communicating the first clock signal on a first clock bus coupled between the memory controller and first memory device;

means for synchronizing a transfer of data from the memory controller to the first memory device with the first clock signal;

means for generating a second clock signal separately from the first clock signal;

means for communicating the second clock signal on a second clock bus coupled between the memory controller and first memory device, wherein the first and second clock buses are separate buses; and means for synchronizing a transfer of data from the first memory device to the memory controller with the second clock signal, wherein the means for synchronizing the transfer of data from the memory controller to the first memory device with the first clock signal further comprises:

means for synchronizing an operation of a first receiving latch in the first memory device with an operation of a first sending latch in the memory controller.

30. The system as recited in claim 29, wherein the first and second clock buses are separate buses, wherein the first and second clock signals are separately generated but are synchronized with each other.

31. The system as recited in claim 29, wherein the means for communicating the first clock signal further comprises:

means for sending the first clock signal on the first clock bus from the memory controller to the first memory device, wherein the means for communicating the second clock signal further comprises:

means for sending the second clock signal on the second clock bus from the first memory device to the memory controller.

32. The system as recited in claim 29, wherein the means for synchronizing the transfer of data from the first memory device to the memory controller with the second clock signal further comprises:

means for synchronizing an operation of a second sending latch in the first memory device with an operation of a second receiving latch in the memory controller.

* * * * *